Aug. 8, 1939.  R. S. CONDON  2,168,818
FLUID PACKING
Original Filed Nov. 27, 1936
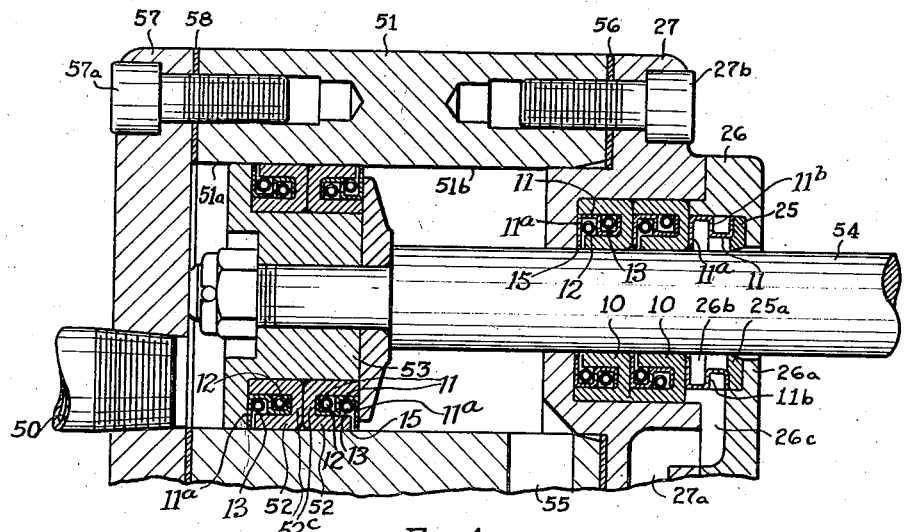
Fig. 4
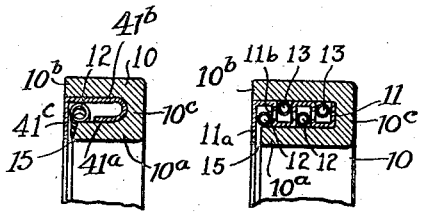
Fig. 6   Fig. 2
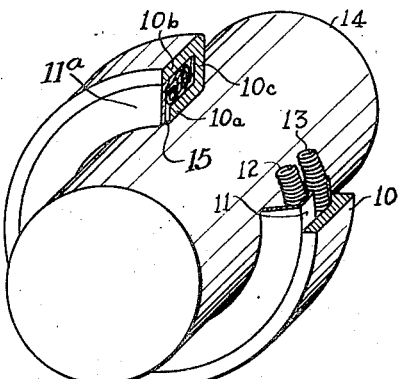
Fig. 1
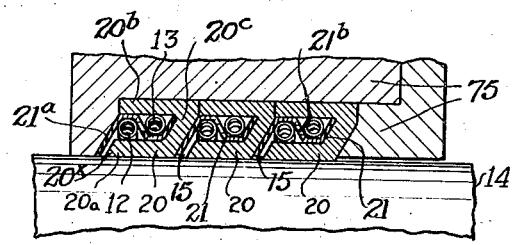
Fig. 3
Fig. 7
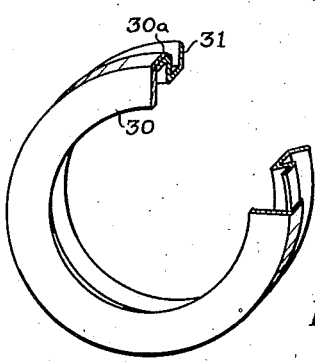
Fig. 5
INVENTOR
BY Robert S. Condon
ATTORNEYS Patented Aug. 8, 1939

2,168,818

UNITED STATES PATENT OFFICE 2,168,818

FLUID PACKING

Robert S. Condon, Rutland, Vt.

Application November 27, 1936, Serial No. 113,065
Renewed January 10, 1939

13 Claims. (Cl. 286—26)

This invention relates to fluid packings and the like for sealing against fluid pressures, and the principal object of this invention is to provide flexible U-shaped packings for shafts, pistons, or the like having spacers therein between the legs of the U-packing carrying tension and compression members adapted to urge the legs into contact with the surfaces of the shafts or pistons and their glands so that proper sealing will be effected throughout the life of the packing without necessitating any initial adjustment, or subsequent take-up of the packing occasioned by wear even though the packings are required to withstand high pressures, such as 1000 lbs. per square inch.

Heretofore the use of U-packings has been greatly limited for the reasons that prior designs proved unsatisfactory since upon initial installation the inner lip had to be expanded and the outer lip contracted with considerable force against their respective walls or members to establish an intimacy sufficient to seal. This force was usually insufficient to prevent some fluid (such as oil) from clinging to a sliding rod, and, being scraped off when the rod was in use, forming a small leak. Moreover this force, irrespective of the packing material used, is lessened with absorption therein of the fluid or with exposure of the material to heat. It is also shown by examination of such U-packings, when worn, that the leg of the packing which contacts with the moving member did not in fact form the seal, but that the area of the leg adjacent the base actually formed the seal, since the part of the packing near the base would wear very thin although the thickness of the leg could remain practically constant during use. Thus, in such packings the internal pressure along the leg was offset by a pressure working its way under the leg.

Flexing alone of the leg is not enough to maintain a seal, a full floating sealing leg being necessary to compensate for misalignments of piston rods, and for eccentricities of revolving shafts, as well as for irregularities of the surface sealed. To effect this required seal, it is necessary that the pressure inside the U must exceed by sufficient margin the pressure outside the U, this being accomplished by the grip of the leg on the moving member. When this grip of the leg functions to hold back pressure outside the U the inside pressure will build up and establish a pressure which will itself function to press the U-packing against the moving part to establish a seal.

Again, U-packings heretofore used have proved unsatisfactory because of frequent damage. The legs that form the seals against the moving parts must not be cramped or otherwise damaged to prevent their proper functioning. When a U-packing is held in place by spacers the latter must be pressed in place with a considerable force which may be sufficient to injure the leg; and if the grip of the leg is established by mechanical or other means, the packing is usually not sufficiently held so that the free leg that contacts the moving part is guarded against an injury which would prevent its proper functioning.

Former provisions for mechanically holding a U-packing in place filled the entire space within the U and precluded the provision of any mechanical means for applying contractors and expanders to the legs. My invention however, provides a U-packing which is reliable and effective as a seal, since it utilizes the limited space within the U not only for the application of a spacer for holding the U-packing in place while maintaining the requisite freedom of functioning of the active leg, but also utilizes said space for the application of a mechanical contractor for the inner leg, and a mechanical expander for the outer leg; and moreover my construction avoids the necessity of initial adjustment, or any "take-up", and the entire life of the packing will be used up before any attention is required; and yet the construction permits sealing against high pressure; also the life of my packing is increased over other packings now in use since the grip is sufficient to prevent leakage at all pressures, and the frictional resistance required is only of a magnitude necessary to establish seal.

I will explain the invention with reference to the accompanying drawing which illustrates several practical embodiments thereof to enable others familiar with the art to adopt and use the same; and will summarize in the claims the essential feaures of the invention, the novel features of construction, and novel combinations of parts for which protection is desired.

In said drawing:

Fig. 1 is a perspective view of one form of my novel U-shaped packing mounted around a shaft, a portion of the packing being broken away to show the arrangement of springs.

Fig. 2 is a transverse sectional view through a modified packing in which the spacer houses two compression and two tension springs.

Fig. 3 is a transverse sectional view through a further modified packing showing the use of a gang of three U-packings provided with bias spacers.

Fig. 4 is a transverse section through a cylinder and piston showing the application of gangs of my packings to both the piston and piston rod.

Fig. 5 is a perspective view, partly broken away, showing a modified spacer.

Fig. 6 is a transverse sectional view of a still further modified packing utilizing a single compression spring; and Fig. 7 is a transverse sectional view of a still further modified packing showing a gang consisting of two sizes of U-packings with expanding and contracting springs but with the spacers omitted.

In the drawing, 10 (Fig. 1) represents the flexible U-packing having a short leg 10a and a longer leg 10b; 11 being the spacer, 12 the tension spring, and 13 the compression spring, the spacer 11 and the springs 12, 13 being housed between the legs 10a, 10b of the packing.

The spacer 11 in Fig. 1 may be conveniently formed by spinning a flat sheet metal blank, or by spinning a length of sheet metal tubing, and consists of an annular member having a series of troughs therein opening alternately inwardly and outwardly, said troughs being of depth equal to or slightly less than the space between the legs 10a, 10b of the packing, and being adapted to alternately house and confine the springs 12 and 13, the tension springs 12 being disposed in the inwardly opening troughs, and the compression springs 13 disposed in the outwardly opening troughs. The troughs of the spacer in Fig. 1 are of general rectangular cross-section, and the series is of such length that it will extend from the inner wall of the base 10c of the packing to the outer end of the longer leg 10b. The outermost trough opens towards the shorter leg 10a and the outer wall 11a of said outermost trough extends inwardly to a point opposite the outer face of the shorter leg 10a, so as to substantially meet the shaft 14 or other movable member. Wall 11a forms a backing plate for the base 10c of the next adjacent packing or may contact with the end of the recess as indicated in Fig. 4. The use of the shorter leg provides a gap 15 (Fig. 1) between the wall 11a and the end of the shorter leg 10a so that the fluid whose pressure is being sealed against, when working its way along the shaft, can enter the interior of the U-packing through gap 15, said fluid passing through holes 11b (Fig. 2) in the walls of the series of troughs so as to completely fill the interior of the packing.

U-packing 10 is of a flexible material so that the springs 12 and 13 can effectively act upon the legs 10a, 10b. Springs 12, under tension, hold the shorter leg 10a in place against the shaft or rod 14, while springs 13 under compression expand the longer leg 10b. Thus the spacer 11 acts to hold the U-packing in place, when used either singly or in gangs, by securely supporting the legs at the base 10c with the end 11a forming a backing plate for adjacent packing, and the strength of springs 12 and 13 can be selected as required to control the pressure on the legs according to the duty of the packing.

In Fig. 2 a similar construction is shown in which the spacer is of length to provide four troughs, two housing tension springs 12, and the other two troughs housing compression springs 13.

In Fig. 3 the troughs of the spacers 21 are of blunt V-shaped cross-section with their end walls disposed at angles to the shaft 14. The spacers 21 however perform the same function as spacers 11. Fig. 3 moreover shows a plurality of U-packings 20 in gang formation and held in proper positions by spacers 21. The stuffing box 75 is shaped to receive the assembly of packings 20 and spacers 21. The seal is completed by merely placing the parts shown in position. No "take-up" is provided, nor is such provision needed because the outer legs 20b of the packing are secured in endwise position due to contact with the end walls 21a of spacers 21, and are urged outwardly by springs 13. The inner legs 20a are free to flex, and are urged inwardly by the tension springs 12. The placing of a plurality of packings in the fixed stuffing box provides an effective seal, and lessens the exit of any fluid that clings to the rod 14, and thus extends the life of the packing 20, for when the U-packing nearest the source of pressure has worn beyond its usefulness the next adjacent U-packing functions to seal. The pointed outer end 20x of the inner leg 20a is shaped to effectively remove any fluid from the rod 14, as the same passes out of the packing, the fluid being directed by the beveled end 20x through the gap 15 and into the space between the legs 20a, 20b, the fluid passing through the holes 21b in the walls of the troughs of the packings 20 to the innermost trough of the series, as hereinbefore explained with respect to Figs. 1 and 2.

Fig. 4 shows an installation of U-packings for both a piston and piston rod. The piston rod 54 is packed with a gang of two U-packings 10 such as shown in Fig. 1; while the piston 53 is packed with two packings 52, similar to the packings 10 but the bases 52c of the packings are placed back-to-back, and the end plates 11a of the spacers abut against the ends of the annular recess in the piston. The outer legs of the packings 52 are free to flex, and the expanding springs 13 are placed near their free ends.

In Fig. 4 fluid enters chamber 51a through duct 50 and leakage past the piston 53 is prevented by the packings 52. The fluid in chamber 51b is exhausted through duct 55. Leakage along piston rod 54 is prevented by packings 10. The stuffing box of the piston rod 54 is equipped with a wiper 25 which functions to scrape off any fluid that may cling to the piston rod as it emerges from the gland. When the rod is moving "out" (to the right in Fig. 4) the wiper is drawn up against the shoulder 26a of gland cap 26. When the rod is moving "in", due to the chamfer of wiper 25a and to the flexibility thereof, the fluid still clinging to the rod re-enters chamber 26b, formed by a spacer member 11 inserted between the outer packing 10 and the wiper 25. Fluid collecting in chamber 26b passes through the holes 11b of the spacer 11 and through ducts 26c and 27a in the gland, and is collected for re-use.

Gland 27 is secured to housing 51 by screws 27b and sealed by a gasket 56. End cap 57 is secured to housing 51 by screws 57a and sealed by a gasket 58. Gland cap 26 may be secured on gland 27 by screws (not shown). It will be noted that this entire assembly can be completed by merely putting together the parts shown in the space provided.

No "taking-up" of the packing is required or possible. Packings requiring "taking-up" of an adjustable gland cap on the packing are not satisfactory in many instances because a skilled or specially trained person must perform same, otherwise considerable friction may be placed on the piston rod. This friction will lessen the efficiency of the mechanism, or may stall it entirely. Moreover, the "take-up" type of gland is usually not adjusted in service until leakage has actually occurred, and in some applications packings are so placed that "take-up" may be made inconveniently. The superiority of my packing which is assembled by merely placing the parts in the space provided, and which does not require any initial adjustment or any adjustment during the life of the packing, is obvious.

Fig. 5 illustrates a modified spacer made of two pieces 30 and 31, namely a flanged plate 30 which may be conveniently stamped out of sheet stock, and a grooved member 31 which may be rolled from ribbon stock. The two members may be fastened together to form a unit by spinning lip 30a over the corner 31, or may be secured together in any other desired manner. The one-piece spacer shown in Fig. 1 however has a great commercial advantage over the two-piece spacer shown in Fig. 5 in that dies are unnecessary in its manufacture. The cost of dies, where required, add considerably to the cost of the spacer.

Fig. 6 shows a section through a U-packing which has only its inner lip contracted by a tension spring 12 to effect a seal. The spacer 41 of this packing consists of a U-shaped annular member adapted to fit within the U-packing 10, with its base at the base of the packing, leg 41a of the spacer extending along the short inner leg 10a of the packing, while the other longer leg 41b of the spacer extends to the outer end of the long leg 10b of the packing, and is provided with the end plate 41c corresponding with plate 11a of spacer 11 (Fig. 1). Tension spring 12 is disposed between the end of short leg 41a of the spacer and the end plate 41c and adjacent the gap 15 between the outer end of the short leg 10c of the packing and end plate 41c.

Fig. 7 shows a sectional view through a gang of U-packings in which the legs of the packing members are held in place by tension springs 12 and compression springs 13, the spacers being omitted. The springs 12, 13 fill the space within the U. The U-packing 60 adjacent the pressure side is of short length and is provided with only one spring 12 and one spring 13 designed to seal against heavy pressure. The fluid that leaks past packing 60 is held by the second U-packing 70 which is of longer length and fitted with two compression springs 13 and two tension springs 12 engaging the respective legs of the packing. Thus the duty of sealing is divided between these two packings 60 and 70 and the wear is lessened on the first packing.

In my novel fluid packings the spacers and springs can be re-used in connection with new pliable packings in event replacement of the packings should become necessary.

I claim:

1. A fluid packing for shafts, pistons, or the like, comprising an annular flexible member adapted to be mounted in a recess formed between the shaft or piston and a fixed support; said member having one leg adapted to contact with a fixed wall of the recess, and a second leg adapted to contact with a movable wall of the recess; means interposed between the legs for maintaining the first leg in contact with the fixed wall; and means for urging the second leg into contact with the movable wall, said maintaining means comprising compression springs expanding against the first leg; said urging means comprising tension springs contracting against the second leg; and a spring engaging member maintaining the springs in spaced relation.

2. A fluid packing for shafts, pistons, or the like, comprising an annular flexible member adapted to be mounted in a recess formed between the shaft or piston and a fixed support; said member having one leg adapted to contact with a fixed wall of the recess, and a second leg adapted to contact with a movable wall of the recess; a spacer interposed between the legs and having recesses opposite the legs; means in the recesses for urging the first leg in contact with the fixed wall; and means in the recesses for urging the second leg in contact with the movable wall.

3. In a packing as set forth in claim 2, said packing being U-shaped in cross section with its first leg extending the full length of the fixed wall; the second leg being shorter than the first leg to provide a gap between its free end and the adjacent end of the recess.

4. In a packing as set forth in claim 2, said packing comprising a gang of members having their first legs filling the entire length of the recess; the second legs being shorter than the first legs to provide gaps between their free ends and the adjacent member or adjacent end of the recess.

5. In a packing as set forth in claim 2, said maintaining means comprising compression springs expanding against the first leg; said urging means comprising tension springs contracting against the second leg; and said spacer maintaining the springs in spaced relation.

6. In a packing as set forth in claim 2, said spacer comprising an annular member filling the space between the legs and having oppositely opening troughs forming the recesses; the outer wall of the outermost trough extending from the free end of the first leg to a position opposite the free end of the second leg.

7. In a packing as set forth in claim 2, said spacer comprising an annular member filling the space between the legs and having oppositely opening communicating troughs forming the recesses; the outermost trough opening opposite the free end of the second leg; and the outer wall of said outermost trough extending from the free end of the first leg to a position opposite the free end of the second leg.

8. The combination with a U-shaped flexible shaft packing of a spacer, comprising an annular member housed within the legs of the packing and having recesses in its inner and outer faces; one end wall of the spacer being adapted to closely embrace the shaft to form a support for the base of an adjacent packing; and resilient means in the recesses engaging the legs of the packing.

9. In a combination as set forth in claim 8, the recesses being intercommunicating throughout the length of the member.

10. In a combination as set forth in claim 8, said spacer being formed of a recessed tubular member and a flanged annular member secured together.

11. A spacer for U-shaped shaft packings and the like, comprising an annular member adapted to be housed within the legs of the packing and having recesses in its inner and outer faces, the recesses being interconnected throughout the length of the member.

12. A spacer for U-shaped shaft packings and the like, comprising an annular member adapted to be housed within the legs of the packing and having recesses in its inner and outer faces; one end wall of the spacer being adapted to closely embrace the shaft beyond the legs of the packing to form a support for the base of an adjacent packing; and said spacer being formed of a recessed tubular member and a flanged annular member secured together.

13. In a spacer as set forth in claim 12, the recesses being intercommunicating throughout the length of the member.

ROBERT S. CONDON.